United States Patent [19]

Ho et al.

[11] Patent Number: 5,476,992
[45] Date of Patent: Dec. 19, 1995

[54] IN-SITU REMEDIATION OF CONTAMINATED HETEROGENEOUS SOILS

[75] Inventors: Sa V. Ho, Creve Coeur; Philip H. Brodsky, Creve Coeur, both of Mo.

[73] Assignee: Monsanto Company, St. Louis, Mo.

[21] Appl. No.: 153,142

[22] Filed: Nov. 17, 1993

Related U.S. Application Data

[63] Continuation-in-part of Ser. No. 87,540, Jul. 2, 1993, abandoned.

[51] Int. Cl.⁶ .................................................. C25C 1/22
[52] U.S. Cl. .................. 588/204; 204/182.1; 204/182.2; 204/299 R; 405/128; 405/129; 405/130; 405/131; 405/258
[58] Field of Search .............................. 204/130, 182.2, 204/299 R, 182.1; 405/128, 129, 130, 131, 258; 588/204

[56] References Cited

U.S. PATENT DOCUMENTS

| | | | |
|---|---|---|---|
| 4,067,389 | 1/1978 | Savins | 166/246 |
| 4,378,845 | 4/1983 | Medlin et al. | 166/297 |
| 4,964,466 | 10/1990 | Williams et al. | 166/300 |
| 5,009,797 | 4/1991 | Penny et al. | 252/8.551 |
| 5,057,227 | 10/1991 | Cohen | 210/680 |
| 5,074,986 | 12/1991 | Probstein et al. | 204/130 |
| 5,098,538 | 3/1992 | Kim et al. | 204/182.2 |
| 5,106,233 | 4/1992 | Breaux | 405/128 |
| 5,135,058 | 8/1992 | Millgard et al. | 175/71 |
| 5,137,608 | 8/1992 | Acar et al. | 204/130 |
| 5,181,796 | 1/1993 | DeYoung | 405/128 |
| 5,193,934 | 3/1993 | Johnson et al. | 405/128 |

FOREIGN PATENT DOCUMENTS

| | | |
|---|---|---|
| 0312174A1 | 4/1989 | European Pat. Off. . |
| 0504551 | 1/1992 | European Pat. Off. . |
| WO91/01392 | 2/1991 | WIPO . |
| WO91/08176 | 6/1991 | WIPO . |
| WO92/06802 | 4/1992 | WIPO . |
| WO92/19545 | 11/1992 | WIPO . |
| WO92/19556 | 11/1992 | WIPO . |

OTHER PUBLICATIONS

Probstein et al., "Removal of Contaminants form Soil by Electric Fields." Apr. 1993, pp. 498–503.
Horng et al., "Evaluating Electro–Kinetics as a Remedial Action Technique," Aug. 1987, pp. 65–77.

(List continued on next page.)

*Primary Examiner*—John Niebling
*Assistant Examiner*—Arun S. Phasge
*Attorney, Agent, or Firm*—Kenneth D. Goetz; Paul L. Passley; James C. Bolding

[57] ABSTRACT

A process for the in-situ remediation of a contaminated heterogeneous soil region comprising: (a) introducing material for treating contaminants in a contaminated heterogeneous soil region into at least one liquid permeable region within the contaminated heterogeneous soil region to form at least one treating zone within the contaminated heterogeneous soil region, (b) transmitting direct electric current through at least one low permeability soil region within the contaminated heterogeneous soil region between a first electrode and a second electrode having opposite charge, wherein (i) the first electrode is located at a first end of the contaminated heterogeneous soil region and the second electrode is located at the opposite end of the contaminated heterogeneous soil region or (ii) the first electrode is located at a first end of each of the low permeability soil regions and the second electrode is located at the opposite end of each of the low permeability soil regions, (1) to cause an electroosmotic flow from the second electrode to the first electrode, (2) to cause an electromigratory movement of ionic contaminants in a direction toward the electrode of opposite charge, or (3) to cause an electroosmotic flow from the second electrode to the first electrode and an electromigratory movement of ionic contaminants in a direction toward the electrode of opposite charge, and (c) applying a hydraulic gradient across the contaminated heterogeneous soil region to cause a hydraulic flow from the high pressure end of the contaminated heterogeneous soil region to the low pressure end of the contaminated heterogeneous soil region.

46 Claims, 2 Drawing Sheets

OTHER PUBLICATIONS

Murdoch et al., "Hydraulic Fracturing to Increase Fluid Flow." (No Month) 1990 pp. 1087–1093.

Lageman, et al, "Electro–Reclamation: Theory and Practice", Chemistry and Industry, No. 18, Sep. 18, 1989, London GB, pp. 585–590.

Acar, Y. B., "Electrokinetic Cleanups", *Civil Eng.*, Oct. 1992, pp. 58–60.

Acar, Y. B., "Phenol Removal from Kaolinite by Electrokinetics", *J. Geotechnical Eng.*, vol. 118, No. 11, pp. 1837–1852 (Nov. 1992).

Segall, B. A. et al "Electroosmotic Contaminant–Removal Processes", *J. Environmental Eng.*, vol. 118, No. , pp. 84–100 (Jan./Feb. 1992).

Bruell, C. J., "Electroosmotic Removal of Gasoline Hydrocarbons and TCE from Clay", *J. Environmental Eng.*, vol. 118, No. 1, pp. 68–83 (Jan./Feb. 1992).

Acar, Y. B. et al., "Electrochemical Processing of Soils: Theory of pH Gradient Development by Diffusion, Migration, and Linear Convection", *J. Environ. Sci. Health*, A25(6), pp. 687–714 (1990) (No Month).

Corapcioglu, M. Y., "Formation of Electro–Chemico–Osmotic Processes in Soils", *Transport in Porous Media*, 6, pp. 435–444 (1991) (No Month).

U.S. Environmental Protection Agency–Office of Research and Development, "Hydraulic Fracturing to Enhance Elimination in the Subsurface Soil by Vapor Extraction or Bioremediation", Risk Reduction Engineering Laboratory–Cincinnati, Ohio, pp. 28–29 (Sep. 1992).

Davis–Hoover, W., U.S. Environmental Protection Agency–Office of Solid Waste and Emergency Response, "Hydraulic Fracturing Enhances In Situ Remediation":, *Groundwater Currents*, pp. 1,4 (Sep. 1992).

Steimle, R., U.S. Environmental Protection Agency–Office of Solid Waste and Emergency Response, "In Situ Groundwater Treatment Research and Demos Inventoried":, *Groundwater Currents*, pp. 2,4 (Sep. 1992).

O'Hannesin, S. F. and Gillham, R. W., "A Permeable Reaction Wall for In Situ Degradation of Halogenated Organic Compounds", paper presented at the 45th Canadian Geotechnical Society Conference, Toronto, Ontario, Oct. 25–28, 1992.

Waterloo Groundwater control Technologies, "Waterloo Barrier", technical brochure (No Dates).

Envirometal technologies inc., "the envirometal process–metal–enhanced abiotic degradation of chlorinated organic compounds", technical brochure (No Dates).

McLaren Hart/Accutech Remedial Systems, "Pneumatic Fracturing, Extraction and Hot Gas Injection", technical brochure (No Dates).

Alshawabkeh, A. N. et al., "Removal of Contaminants from Soils by Electrokinetics: A Theoretical Treatise", *J. Environ. Sci. Health*, Part A. A27(7), pp. 1835–1861 (1992) (No Month).

Murdoch, L. et al., "Technologies of Delivery or Recovery for the Remediation of Hazardous Waste Sites", U.S. Environmental Protection Agency–Office of Research and Development, Risk Reduction Engineering Laboratory–Cincinnati, Ohio, pp. 1–90 (Jan. 1990).

Sanning, D. E. et al., "NATO/CCMS Pilot Study Demonstration of Cleanup Technologies for Contaminated Soils and Groundwater. The Newest Results", Altlastensanierung 90, Int. KfK/TNO Kongr., 3rd, Meeting Date 1990, pp. 963–972 (1991) (No Month).

Lageman, R. et al., "Electro Treatment: State of the Art and Future Developments":, Altlastensanierung 90, Int. KfK/TNO Kongr., 3rd. Meeting Date 1990, pp. 1197–1204 (1991) (No Month).

Murdoch, L. C. et al., "Hydraulic Fracturing for Increasing Fluid Flow in the Ground", Altlastensanierung 90, Int. KfK/TNO Kongr., 3rd, Meeting Date 1990, pp. 1217–1226 (1991) (No Month).

Shapiro, A. P. and Probstein, R. F., "Removal of Contaminants From Saturated Clay Electroosmosis", *Environ. Sci. Technol.*, vol. 27, pp. 283–291 (1993) (No Month).

Murdoch, L., "Some Recent Developments in Delivery and Recovery Hydraulic Fracturing and Directional Drilling", *Proceedings of ETEX '92–The 2nd Annual Environmental Technology Exposition and Conference*, Washington, D.C., Apr. 7–9, 1992, pp. 1–13.

Davis–Hoover, W. J. et al., "Hydraulic Fracturing to Improve Nutrient and Oxygen Delivery for In Situ Bioreclamation", In Situ Bioreclamation–Applications and Investigations for Hydrocarbon and Contaminated Site Remediation, Edited by R. E. Hinchee and R. F. Olfenbuttel, Butterworth–Heinmann (1991), pp. 67–82 (No Month).

Murdoch, L. C., "Hydraulic and Impulse Fracturing Techniques to Enhance the Remediation of Low Permeability Soils", Center for GeoEnvironmental Research, Center Hill Research Facility, University of Cincinnati–this document is a draft version that was presented to Monsanto Co. during a meeting with the EPA in Mar. 1993.

Vesper, S. et al., "The Use of Hydraulic Fracturing to Enhance In Situ Bioremediation", Eighteenth Annual Risk Reduction Engineering Laboratory Research Symposium, Apr. 1992, pp. 59–61.

Murdoch, L. C. et al., "Hydraulic Fracturing to Increase Fluid Flow", F. Arendt, M. Hinsenveld and W. J. van den Brink (eds.), Contaminated Soil '90, pp. 1087–1094, Kluwer Academic Publishers (1990) No Month.

Murdoch, L. C. et al., "Feasibility of Hydraulic Fracturing of Soil to Remedial Actions", EPA Project Summary, Risk Reduction Engineering Laboratory, Aug. 1991.

Murdoch, L. C., "A Field Test of Hydraulic Fracturing in Glacial Till", Proceedings of the Fifteenth Annual Research Symposium, Cincinnati, Ohio Apr. 10–12, 1989, pp. 164–174.

Handbook on "In Situ Treatment of Hazardous Waste–Contaminated Soils", EPA Risk Reduction Engineering Laboratory, Jan. 1990, pp. 96–97.

Probstein, R. F. et al., "Removal of Contaminants from Soils by Electric Fields", *Science*, vol. 260, pp. 498–503, Apr. 23, 1993.

Murdoch, L. et al., "Directional Drilling", Center Hill technical brochure, U.S. EPA Center Hill Facility and Research Facility for Solid and Hazardous Waste Treatment. (No Dates).

Murdoch, L. et al., "Innovative Delivery and Recovery: Hydraulic and Impulse Fracturing to Facilitate Remediation", Center Hill technical brochure, U.S. EPA Center Hill Facility and Research Facility for Solid and Hazardous Waste Treatment. (No Dates).

Vesper, S. et al., "Understanding and Performing In Situ Bioremediation", Center Hill technical brochure, U.S. EPA Center Hill Facility and Research Facility for Solid and Hazardous Waste Treatment. (No Dates).

Olsen, R. L. et al., "Can Groundwater Restoration Be Achieved?", *Water Environment & Technology*, Mar. 1993, pp. 42–47.

Cabrera–Guzmán, D. et al., "The Use of Electrokinetics for Hazardous Waste Site Remediation", *J. Air Waste Manage. Assoc.,* 40: 1670–76 (1990). (No Month).

Li, H. and Gale, R. J., "Hydraulic and Electroosmotic Flow through Silica Capillaries", *Langmuir,* 9, 1150–565 (1993). (No Month).

Renaud, P. C. and Probstein, R. F., "Electroosmotic Control of Hazardous Wastes", *PCH PhysicoChemical Hydrodynamics,* 9 (1–2), 345–60 (1987). (No Month).

Horng, J. J. et al., "Evaluating Electrokinetics as a Remedial Action Technique", U.S. Environ. Prot. Agency, Res. Dev., EPA Report No. EPA/600/9–87/018F, Proc.: 2nd Int. Conf. New Front. Hazard Waste Manage., pp. 65–77 (Sep. 27–30, 1987).

Workshop on Electro–kinetic Treatment and its Application in Environmental–Geotechnical Engineering for Hazardous Waste Site Remediation, Unpublished Proceedings, University of Washington, Dept. of Civil Engineering, Seattle, Wash., Aug. 4–5, 1986.

Haggin, J., "Microbially Based Treatment Process Removes Toxic Metals, Radionuclides", *C&EN,* vol. 70, No. 30, pp. 35–36 (Jul. 27, 1992).

McMurty, D. C. and Elton, R. O., "New Approach to In–Situ Treatment Treatment of Contaminated Groundwaters", *Environmental Progress,* pp. 168–170 (Aug., 1985).

Lageman, R., "Electroreclamation: Applications in the Netherlands", *Environ. Sci. Technol.,* vol. 27, No. 13, pp. 2648–2650 (1993). (No Month).

Gadd, G. M., "Accumulation of Metals by Microorganisms and Algae", Biotechnology–Special Microbial Processes, vol. 6, Chapter 13, pp. 401–423, eds. Rehm, H. J. and Reed, G. (1988). (No Month).

Runnells, D. D. and Wahli, C., "In Situ Electromigration as a Method for Removing Sulfate, Metals, and Other Contaminants from Ground Water", *Ground Water Monit. Rev.,* pp. 121–129 (Winter 1993). (No Month).

Hamed, J. et al., "Pb(II) Removal from Kaolinite by Electrokinetics", *Journal of Geotechnical Engineering,* ASCE, vol. 117, No. 2, pp. 241–271 (Feb. 1991).

Al–Abed, S. R. et al., "Metal Speciation Research", Center Hill technical brochure, U.S. EPA Center Hill Facility and Research Facility for Solid and Hazardous Waste Treatment. (No Date Given).

Slack, Bill et al., "Mobility of Metals in Soils", Center Hill technical brochure, U.S. EPA Center Hill Facility and Research Facility for Solid and Hazardous Waste Treatment. (No Date Given).

Puls, R. W. et al., "Innovative Remediation of Chromium", *Groundwater Currents,* p. 2 (1993). (No Month).

Runnells, D. D. and Larson, J. L., "A Laboratory Study of Electromigration as a Possible Field Technique for the Removal of Contaminants from Ground Water", *Ground Water Monit. Rev.,* vol. 6, No. 3, pp. 85–91 (Summer 1986). (No Month).

McCullough, M. L. and Dagdigian, J. V., "Evaluation of Remedial Options for Treatment of Heavy Metal and Petroleum Hydrocarbon Contaminated Soil", *Remediation,* pp. 265–286 (Summer 1993). (No Month Given).

Lageman, R. et al., "Electro–Reclamation: State–of–the–Art", pp. 1–12 (No Date Provided).

IN-SITU REMEDIATION OF CONTAMINATED HETEROGENEOUS SOILS

This application is a continuation-in-part of U.S. Ser. No. 08/087,540, filed Jul. 2, 1993 now abandoned.

BACKGROUND OF THE INVENTION

This invention relates to in-situ remediation of contaminated heterogeneous soils. In one aspect, this invention relates to a novel process combining electroosmosis and/or electromigration, hydraulic flow and in-situ treatment of contaminants in treating zones using biological, physicochemical, or electrochemical means. In a further aspect, this invention relates to a novel process for the in-situ remediation of soils contaminated with toxic organic compounds and/or toxic ionic contaminants such as metals and radionuclides.

Generally, degradation of toxic organic compounds to innocuous products such as $CO_2$ and water can be accomplished either biologically or physicochemically provided the treatment is carried out in a well-controlled environment in which key operating parameters such as temperature, pressure, mixing, addition of the reactants or nutrients, etc., are optimized. Examples of these technologies include incineration and its variations, supercritical water oxidation, $UV/H_2O_2$/ozone/catalytic oxidation, reductive dehalogenation and biodegradation in an optimized bio-reactor. However, the cost associated with these technologies are high for the decontamination of soil, which must first be excavated and then processed into a form suitable for the particular reactor used. The reactor constitutes a major portion of the overall cost in these processes due to either the extreme conditions required with thermal approaches or the very long holding times required in biological approaches. To overcome these problems, destruction of the contaminants needs to be done in-situ to avoid the cost and complications associated with excavation and handling, and the process has to be energy efficient and mild to minimize capital and operating costs.

Many in-situ technologies have been proposed and developed for remediating contaminated soil and ground water. Since most sub-surface soils are heterogeneous, i.e., consisting of various zones of low permeability, e.g., clay soil, silty soil or fractured bedrock, within regions of high permeability, e.g., sandy soil or vice versa, such technologies are generally not very effective.

Hydraulic or pressure-driven flow, e.g., pumping or soil flushing, causes preferential flow in areas of high permeability. Slow contaminant diffusion from the low permeability zones into the preferential flow paths results in steady, low-level release of the contaminant and unsatisfactorily long clean up times. This is a major problem with conventional Pump and Treat technology which is the primary method utilized for remediating ground water contamination. Pump and Treat, where water is pumped from the contaminated aquifers, treated and then discharged, is rather ineffective with clean up times projected to be much longer than originally estimated. In cases of an immobile zone containing substantial quantities of absorbed contaminants or if non-aqueous phase liquids are present, the clean up times have been projected to be hundreds of years.

Due to the limitations of Pump and Treat, several enhancements to Pump and Treat have been developed and evaluated. These include reinjection of treated ground water, pulsing and in-situ bioremediation. However, these enhancement techniques have not demonstrated significant improvements to providing permanent solutions or reducing cost. Reinjection of treated ground water has been found to reduce cleanup times by up to 30% but without any reduction of cost. Pulsing of the Pump and Treat system has application where diffusion controls the release of contaminants but studies have found that cleanup times were longer even though cost may be lower because less water is treated. In-situ bioremediation will also not increase the cleanup rates of Pump and Treat systems where contamination release is diffusion controlled because cleanup time is still controlled by the diffusion from the immobile zone. In addition, little has been accomplished in enhancing cleanup time and achieving remediation goals if sufficient amounts of contamination are present in low permeability zones.

Various techniques have been suggested for application in processes for the in-situ remediation of low permeability contaminated soils. An example of such a technique is electroosmosis. However, electroosmosis as currently practiced suffers from limitations which make it commercially impractical.

Electrokinetics, specifically electroosmosis, has been suggested for use in in-situ remediation of soils contaminated with non-ionic, soluble organic compounds. Electroosmosis involves applying an electrical potential between two electrodes immersed in soil to cause water in the soil matrix to move from the anode to the cathode when soils are negatively charged, such as is the case with clay soils. When the soil is positively charged, however, the direction of the flow would be from the cathode to the anode. The technique has been used since the 1930's for removing water from clays, silts and fine sands. The major advantage for electroosmosis as an in-situ remediation method for difficult media, e.g., clay and silty sand is its inherent ability to get water to flow uniformly through clay and silty sand at 100 to 1,000 times faster than attainable by hydraulic means, and with very low energy usage. Electroosmosis has two major limitations as currently practiced that makes it impractical for actual field remediation. First, the liquid flow induced by electroosmosis is extremely slow, i.e., about 1 inch per day for clay soils, which could result in a cumbersome and very long-term operation in large scale operations. Second, several laboratory studies, (see Bruell, C. J. et al., "Electroosmotic Removal of Gasoline Hydrocarbons and TCE from Clay", J. Environ. Eng., Vol. 118, No. 1, pp. 68–83, January/February 1992 and Segall, B. A. et al., "Electroosmotic Contaminate-Removal Processes", J. Environ. Eng., Vol. 118, No. 1, pp. 84–100, January/February 1992) have indicated that part of the soil bed became dry after approximately 1 month under the electroosmotic effect, resulting in reduced flow and the eventual stoppage of the process. Another laboratory study (see Shapiro, A. P. et al., "Removal of Contaminants From Saturated Clay by Electroosmosis", Environ. Sci. Technol., Vol. 27, No. 2, pp. 283–91, 1993) has indicated that the acid generated at the anode moves through the soil bed in the direction of the cathode and results in reduced electroosmotic flow and eventual stoppage of the process.

In addition, electroosmosis generally is ineffective for soils of relatively high permeability, e.g., relatively loosely packed sandy soils. Typically for a voltage gradient of 1 V/cm, electroosmotic permeability is in the range of $10^{-5}$ to $10^{-4}$ cm/sec. In comparison, hydraulic permeabilities of sandy soils are normally $>10^{-3}$ cm/sec. Thus for heterogeneous soils, once the liquid exits the low permeability zone it is no longer under the effective control of electroosmotic force and hydraulic force and/or gravity will dominate the flow direction of the liquid. This is the major reason that electroosmosis has been viewed as limited to applications for treating low permeability soils having a hydraulic permeability in the range $10^{-8}$ to $10^{-4}$ cm/sec.

Several techniques have been suggested for application in processes for the remediation of soils contaminated with ionic contaminants such as heavy metals and radionuclides. Ex-situ techniques, e.g. separation, involves removing the soil containing ionic contaminants and treating the soil ex-situ to remove contaminants. Examples of separation techniques include soil washing and extraction. However, ex-situ methods are not commercially acceptable due to economic considerations resulting from the required excavation and treatment of the contaminated soil. In situ methods include electromigration and immobilization.

Electrokinetics, specifically electromigration, involves applying an electrical potential between two electrodes immersed in soil to cause solute, e.g. ions of metals, to migrate through a solution along the imposed voltage gradient, i.e. electromigratory movement. The charged species of metals in the soil migrate toward the oppositely charged electrodes and are collected at the electrodes. Electromigration has several limitations as currently practiced that make it impractical for actual field remediation. First, pH of the solution near the cathode tends to be very alkaline due to water electrolysis at the electrode and this causes most metals to precipitate in the soil making it difficult to remove the contaminants as well as blocking the flow of water through the contaminated soil region. Second, electrokinetics is inherently not a very stable process due to build-up of concentration, pH and osmotic gradients in the soil between the electrodes which adversely affect the process. In addition, the soil itself will also be altered over time, e.g. the soil will suffer from drying and cracking.

Immobilization encapsulates the contaminant in a solid matrix. Traditional immobilization options for heavy metal contaminated soil are solidification/stabilization (S/S) and vitrification. Traditional S/S methods produce monolithic blocks of waste with high structural integrity. However, the presence of hydrocarbons interfere with the S/S matrix and can increase the leachability of heavy metals when metals partition into the organic phase. Vitrification involves heating the contaminated soil to form chemically inert materials, e.g. glass. In vitrification, large electrodes are inserted into soil that contains significant levels of silicates. An electrical current is applied and the heat generated melts the soil and contaminants gradually working downward through the soil. The contaminants in the fused soil are not likely to leach. However, neither immobilization or vitrification is an economical commercial process.

Soil contaminated with toxic organic compounds and heavy metals and/or radionuclides present additional problems since remedial schemes for one type of contamination are often inappropriate for the other. For example, traditional remediation techniques for organic compounds such as bioremediation, incineration and thermal desorption are generally ineffective on heavy metals. In addition, the presence of most heavy metals can have toxic effects on microorganisms utilized to degrade organic contaminants. Treatment of mixed waste contamination typically requires a combination of various methods resulting in higher costs which are unacceptable.

An in-situ remediation process for use in heterogeneous soil regions which is commercially practical and economical, and solves the above-problems with the currently known technologies would be highly desirable. It has now been found that a combination of electrokinetics, pressure-driven or hydraulic flow and in-situ contaminant degradation in treating zones using biological, physicochemical or electrochemical means solves the above-described problems.

SUMMARY OF THE INVENTION

It is an object of the invention to provide a process for the in-situ remediation of contaminated heterogeneous soil. It is a further object of the invention to provide a commercially practical and economical process for the in-situ remediation of contaminated heterogeneous soil. It is yet a further object of the invention to provide a process for the in-situ remediation of contaminated heterogeneous soil which does not suffer from the current problems associated with the use of electrokinetics, hydraulic flow and biological or physicochemical degradation.

According to the invention, a process for the in-situ remediation of a contaminated heterogeneous soil region is provided which comprises introducing material for treating contaminants in the contaminated heterogeneous soil region into at least one liquid permeable region within the contaminated heterogeneous soil region to form at least one treating zone within the contaminated heterogeneous soil region; transmitting direct electric current through at least one low permeability soil region within the contaminated heterogeneous soil region between a first electrode and a second electrode having opposite charge, wherein (i) the first electrode is located at a first end of the contaminated heterogeneous soil region and the second electrode is located at the opposite end of the contaminated heterogeneous soil region or (ii) the first electrode is located at a first end of each of the low permeability soil regions and the second electrode is located at the opposite end of each of the low permeability soil regions, (1) to cause an electroosmotic flow from the second electrode to the first electrode, (2) to cause an electromigratory movement of ionic contaminants in a direction toward the electrode of opposite charge, or (3) to cause an electroosmotic flow from the second electrode to the first electrode and an electromigratory movement of ionic contaminants in a direction toward the electrode of opposite charge; and applying a hydraulic gradient across the contaminated heterogeneous soil region to cause a hydraulic flow from the high pressure end of the contaminated heterogeneous soil region to the low pressure end of the contaminated heterogeneous soil region.

DETAILED DESCRIPTION OF THE INVENTION

Figure 1:
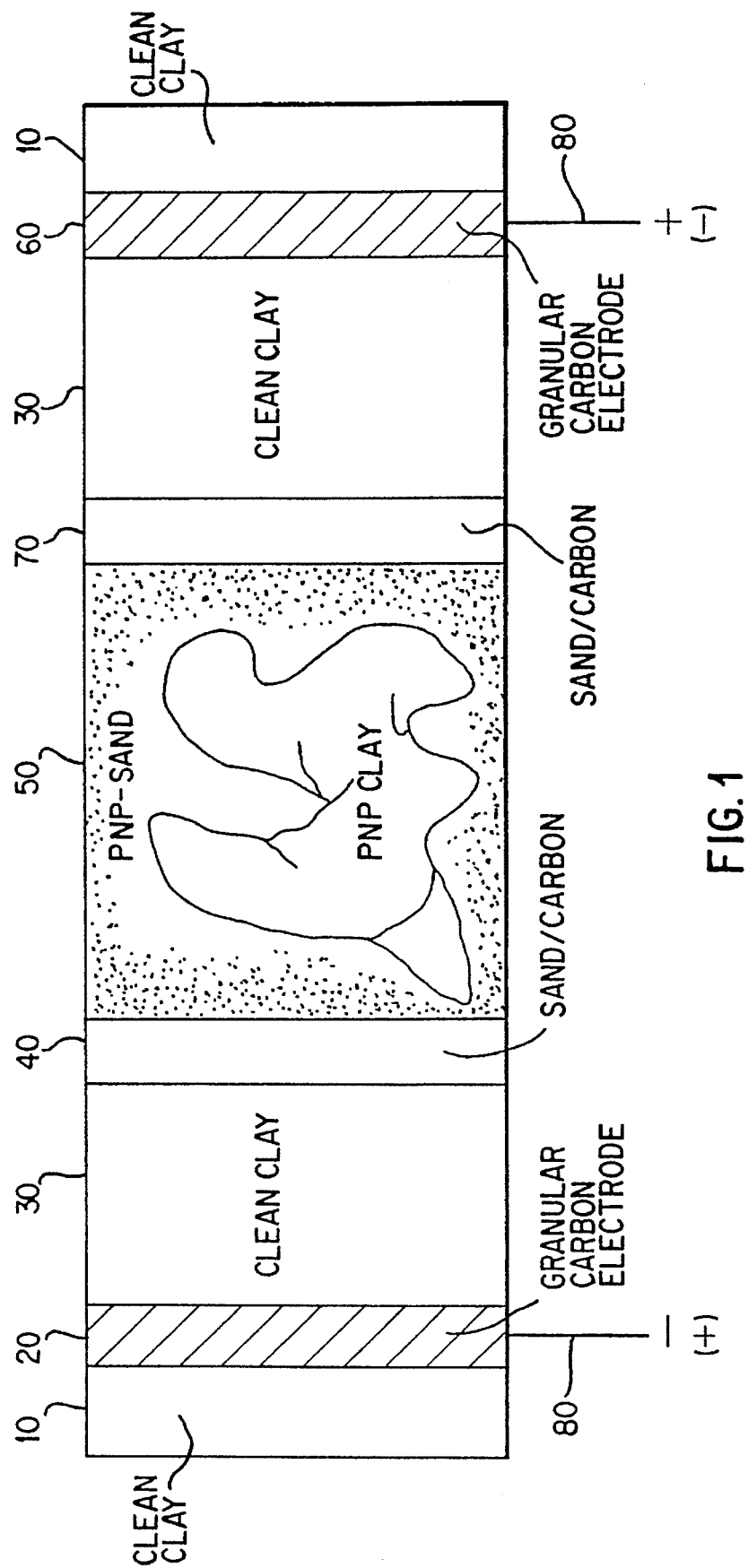
FIG. 1 is a view of the electroosmotic cell set-up used in Example 1.

A first embodiment of the invention relates to a process for the in-situ remediation of a contaminated heterogeneous soil region comprising: (a) introducing material for treating contaminants in the contaminated heterogeneous soil region selected from the group consisting of microorganisms, nutrients, electron acceptors, catalysts, adsorbents, surfactants, electron donors, co-metabolites, chelating agents, ion exchange resins, buffers, salts and combinations thereof, into at least one liquid permeable region within the contaminated heterogeneous soil region to form at least one treating zone within the contaminated heterogeneous soil region; (b) transmitting direct electric current through at least one low permeability soil region within the contaminated heterogeneous soil region between a first electrode and a second electrode having opposite charge, wherein (i) the first electrode is located at a first end of the contaminated heterogeneous soil region and the second electrode is located at the opposite end of the contaminated heterogeneous soil region or (ii) the first electrode is located at a first end of each of the low permeability soil regions and the second electrode is located at the opposite end of each of the low permeability soil regions, (1) to cause an electroosmotic flow from the second electrode to the first electrode, (2) to cause an electromigratory movement of ionic contaminants in a direction toward the electrode of opposite charge, or (3) to cause an electroosmotic flow from the second electrode to the first electrode and an electromigratory movement of ionic contaminants in a direction toward the electrode of opposite charge, and (c) applying a hydraulic gradient across the contaminated heterogeneous soil region to cause a hydraulic flow from the high pressure end of the contaminated heterogeneous soil region to the low pressure end of the contaminated heterogeneous soil region.

In the first embodiment of the process of the invention, the invention further comprises: (d) (1) periodically reversing the polarity of the first and second electrodes to reverse the direction of movement of the contaminants through the treating zones, (2) recycling the water from the electroosmotic flow from the first electrode to the second electrode, or (3) periodically reversing the polarity of the first and second electrodes to reverse the direction of movement of the contaminants through the treating zones and recycling the water from the electroosmotic flow in the direction opposite the electroosmotic flow. In the first embodiment of the process of the invention, the invention further comprises periodically reversing the hydraulic gradient across the contaminated heterogeneous soil region to reverse the direction of hydraulic flow though the contaminated heterogeneous soil region. The reversal of the hydraulic gradient can be done alone or in combination with the reversal of polarity or recycling of the electroosmotic flow.

A second embodiment of the invention relates to a process for the in-situ remediation of a contaminated heterogeneous soil region comprising: (a) forming at least one liquid permeable region within said contaminated heterogeneous soil region, (b) introducing material for treating contaminants in the contaminated heterogeneous soil regions selected from the group consisting of microorganisms, nutrients, electron acceptors, catalysts, adsorbents, surfactants, electron donors, co-metabolites, chelating agents, ion exchange resins, buffers, salts and combinations thereof, into at least one liquid permeable region within the contaminated heterogeneous soil region to form at least one treating zone within the contaminated heterogeneous soil region, (c) transmitting direct electric current through at least one low permeability soil region within the contaminated heterogeneous soil region between a first electrode and a second electrode having opposite charge, wherein (i) the first electrode is located at a first end of the contaminated heterogeneous soil region and the second electrode is located at the opposite end of the contaminated heterogeneous soil region or (ii) the first electrode is located at a first end of each of the low permeability soil regions and the second electrode is located at the opposite end of each of the low permeability soil regions, (1) to cause an electroosmotic flow from the second electrode to the first electrode, (2) to cause an electromigratory movement of ionic contaminants in a direction toward the electrode of opposite charge, or (3) to cause an electroosmotic flow from the second electrode to the first electrode and an electromigratory movement of ionic contaminants in a direction toward the electrode of opposite charge, and (d) applying a hydraulic gradient across the contaminated heterogeneous soil region to cause a hydraulic flow from the high pressure end of the contaminated heterogeneous soil region to the low pressure end of the contaminated heterogeneous soil region.

In the second embodiment of the process of the invention, the invention further comprises: (e) (1) periodically reversing the polarity of the first and second electrodes to reverse the direction of movement of the contaminants through the treating zones, (2) recycling the water from the electroosmotic flow from the first electrode to the second electrode, or (3) periodically reversing the polarity of the first and second electrodes to reverse the direction of movement of the contaminants through the treating zones and recycling the water from the electroosmotic flow in the direction opposite the electroosmotic flow. In the second embodiment of the process of the invention, the invention further comprises periodically reversing the hydraulic gradient across the contaminated heterogeneous soil region to reverse the direction of hydraulic flow though the contaminated heterogeneous soil region. The reversal of the hydraulic gradient can be done alone or in combination with the reversal of polarity or recycling of the electroosmotic flow.

In another embodiment of the processes of the invention, the hydraulic flow is removed from the low pressure end of the contaminated heterogeneous soil region and treated to remove contaminants contained therein and the treated hydraulic flow is optionally recycled to the contaminated heterogeneous soil region at the high pressure end of the heterogeneous soil region.

In one embodiment of the processes of the invention, the hydraulic gradient across the contaminated heterogeneous solid region is applied continuously. In another embodiment of the processes of the invention, the hydraulic gradient across the contaminated heterogeneous soil region is applied periodically to result in a pulsed hydraulic flow. In a further embodiment of the processes of the invention, the hydraulic flow and the electroosmotic flow are essentially co-current. In yet a further embodiment of the processes of the invention, the hydraulic flow and the electroosmotic flow are in opposing directions. As used here, the term "opposing directions" includes all flow patterns of the hydraulic and electroosmotic flows except essentially co-current flow, i.e., essentially countercurrent, essentially perpendicular and at opposing angles other than about 0°, about 90° and about 180°.

According to the processes of the invention, the electroosmotic flow and/or electromigratory movement and the hydraulic flow can occur sequentially or simultaneously. Further according to the processes of the invention, the liquid permeable regions within the contaminated heterogeneous soil region are formed prior to introducing the material for treating contaminants or existing liquid permeable regions are utilized.

As used herein, the term "contaminated heterogeneous soil region" means a heterogeneous soil region containing organic compounds and/or ionic contaminants, such as metals and/or radionuclides, that contains regions of such low permeability that it is not possible for liquid to be pumped through uniformly by hydraulic means. Examples of such low permeability regions include, but are not limited to, clayey and silty soils.

As used herein, the term "electrokinetics" includes both electroosmosis and electromigration. The type of contaminants in the contaminated soil region and the physical and chemical characteristics of the contaminated soil region, e.g. pH, etc., will determine whether the transmission of direct electric current between the electrodes of opposite charge result in electroosmotic flow causing movement of non-ionic, soluble organic contaminants, electromigratory movement of ionic contaminants or both. The relative nature of electromigration compared to electroosmosis is such that the movement of ionic contaminants by electromigration is about 3–10 times faster than the flow caused by electroosmosis. In cases where both electroosmosis and electromigration occur, it is possible to utilize this difference to improve the efficiency of treating the organic and ionic contaminants by effecting the manner and rate at which they are treated in the treating zones.

In the embodiments of the invention which utilize the recycle of water in the direction opposite the direction of electroosmotic flow, alone or in combination with the reversal of electrode polarity technique, the water may be recycled by any conventional method known to those skilled in the art. Examples of such methods include, but are not limited to, pumping, utilization of a connecting pipe or tube between the electrodes of opposite charge, and, in the case of vertical electrodes near the surface, flooding the surface between the electrodes. It is currently preferred to recycle the liquid by having a connecting pipe or tube between the electrodes of opposite polarity to enable the hydraulic differential between the electrodes of opposite charge to move the water in the direction opposite the electroosmotic flow particularly when used in combination with reversal of electrode polarity to eliminate the need for duplicate equipment.

The currently preferred embodiments of the invention utilize the reversal of electrical polarity of the electrodes to eliminate the problems associated with extended electrokinetic operation alone or in combination with the reversal of the hydraulic gradient across the contaminated heterogeneous soil region to reverse the direction of hydraulic flow though the contaminated heterogeneous soil region.

The liquid permeable regions in the contaminated heterogeneous soil region can be formed by any conventional method known to those skilled in the art. In addition, the liquid permeable regions utilized in the invention can include existing liquid permeable regions within the contaminated heterogeneous soil region. As used herein, the term "liquid permeable region" means a region or zone within the contaminated heterogeneous soil region, either within the low permeability region or the high permeability soil region, that is permeable to liquid during electroosmosis and/or hydraulic flow. The liquid permeable regions can be discrete regions or continuous regions of liquid permeability. As used herein, continuous liquid permeable regions means regions formed within the contaminated heterogeneous soil region which contains mixtures of soil and treating materials, wherein the soil or the treating materials can be the continuous phase. Examples of methods for forming discrete liquid permeable regions include, but are not limited to, hydrofracturing, pneumatic fracturing, impulse fracturing, sheet piling, trench formation, directional drilling and combinations thereof. Trench formation, as used herein, includes slurry wall technology wherein the trench is filled with a slurry that contains material for treating the contaminant in the contaminated heterogeneous soil region provided that the slurry wall is permeable to the liquid during the electroosmosis and/or hydraulic flow portions of the process of the invention. An example of a method for forming a continuous liquid permeable region is soil drilling/mixing. In addition, the liquid permeable regions utilized in the invention can include existing liquid permeable regions within the contaminated heterogeneous soil region. An example of existing liquid permeable regions are sandy regions within tight soils, i.e., low permeability soil regions, that ace commonly referred to as lenses. The currently preferred methods for forming discrete liquid permeable regions in deep contaminated soil regions are hydrofracturing and sheet piling. The currently preferred method for forming liquid permeable regions in shallow contaminated soil regions is trench formation.

In another embodiment of the processes of the invention when the organic and/or ionic contaminants are not degraded within the treating zones, i.e. when the contaminants are adsorbed or otherwise contained within the treating zones, the contaminants are recovered from the treating zones by any conventional method known to those skilled in the art including, but not limited to, extraction, flushing and physical recovery of the treating material, e.g. removable treating material such as porous sheet piling. The specific recovery method will depend on the type of treating material, method used to form the liquid permeable region and type of contaminants present, and will be readily apparent to those skilled in the art.

In yet another embodiment of the processes of the invention, the processes are operated intermittently. Intermittent operation, as used herein, means (a) that additional treating material(s) is (are) added to existing treating zone(s) either with recovery of the current treating material(s) prior to addition of the new treating material(s) as discussed above or without recovery of the current treating material(s), or (b) that the direct electric current which provides the driving force for the electrokinetic process is alternated in an on/off operation to provide, for example, a residence time for contaminants to be degraded in the treating zones, e.g. by biodegradation, before additional contaminants are moved into the treating zones.

In still another embodiment of the processes of the invention, additional liquid permeable regions, and subsequently treating zones, are formed at a time after initiation of the in-situ remediation to do additional treatment of the contaminated soil region. An example of utilizing treating zones formed after initiation of the in-situ remediation is the situation where the original treating zones are used to trap a contaminant which would be toxic to a treating material, e.g. microorganism, if that treating material were present initially.

Hydraulic fracturing is a method to access subsurface soil for remediation purposes. The fracturing of subterranean formations is accomplished by injecting or pumping a fracturing fluid through a wellbore at a sufficient rate and pressure to cause a fracture to form in the formation, i.e., the contaminated heterogeneous soil region. The fracturing fluid is typically viscosified with a gel, e.g., a water-soluble natural or synthetic polymer. Examples of water-soluble polymers, include, but are not limited to, guar, hydroxypropyl guar, carboxy-methylhydroxypropyl guar, methylcellulose and hydroxycellulose.

Hydraulic fracturing can be accomplished by any conventional method known to those skilled in the art, such as those disclosed in U.S. Pat. No. 4,964,466, U.S. Pat. No. 4,378,845, and U.S. Pat. No. 4,067,339. For example, after notching the bottom of a well with a water jet, a guar gum matrix with a granular material, preferably sand, suspended in it is added under sufficient pressure until a pancake-shaped fracture is created. An enzyme is added to break down the guar gum matrix, which can then be pumped back out, leaving a sand lens. These fractures can be stacked as close as 20 cm (8 inches). Nutrients, microorganisms, oxidants, catalysts, adsorbents, surfactants, electron donors, co-metabolites, chelating agents, ion exchange resins, buffers and/or salts can be delivered into the sand lens, i.e., fractures, to form treating zones for degrading the toxic materials present in the contaminated heterogeneous soil region according to the process of the invention. The granular material is generally referred to as a proppant and is necessary to keep the fracture from closing after the water-soluble polymer is broken down and removed.

An improved method of hydraulic fracturing replaces the conventional fracturing fluid with a fracturing fluid comprising an aqueous transport medium and a natural organic material as the proppant. As used herein, the term "natural organic material" are materials which provide excellent surfaces for microbial attachment as well as a long-term source of nutrient supplements for the microorganisms to grow. The diverse organic makeup of these materials may also assist the biodegradation of chlorinated organic compounds, which may require the presence of certain co-metabolites for rapid degradation. Examples of natural organic material include, but are not limited to, sawdust, wood chips, mulch, compost, and the like, and mixtures thereof.

The use of natural organic material as the proppant has several advantages over the use of sand as the proppant. Among these advantages are (1) elimination of the requirement to use a viscosifying agent, e.g. a water-soluble polymer such as the examples given above, and optionally a crosslinking agent, and (2) elimination of the requirement that the polymer matrix be broken down and removed from the fractures by injecting an enzyme or an oxidizing agent, e.g. calcium or sodium hypochlorite and sodium or ammonium persulfate, that attack the polymer matrix or by thermal degradation depending on the temperature in the fracture. In breaking down the polymer matrix, enzymes are typically useful up to a temperature of about 50° C., oxidizing agents are typically useful up to a temperature of about 80° C., and heat alone is typically useful at temperatures above about 135° C. In addition, the natural organic material acts as (a) a support material for the microorganisms in the fractures, (b) a supplemental or alternative nutrient source for the microorganisms, and (c) a moisture storage reservoir which is beneficial to both microbial activity and the electroosmosis process.

The fracturing of subterranean formations using the improved fracturing fluid is accomplished by injecting or pumping the fracturing fluid comprising an aqueous transport medium and a natural organic material through a wellbore at a sufficient flow rate and under sufficient pressure to fracture the subterranean formation, i.e. the contaminated soil region. The hydraulic fracturing fluid comprises an aqueous transport medium and a sufficient amount of natural organic proppant particles suspended in said medium. The amount of natural organic proppant particles necessary is the amount necessary to form the fracture and keep the fracture from closing after the fracture is formed. The amount of fracturing fluid and natural organic proppant particles necessary would be clear to one skilled in the art of hydraulic fracturing using any of the conventional methods known to those skilled in the art. The aqueous transport medium can contain any chemical used in conventional fracturing fluids other than the water-soluble polymers used as viscosifying agents. Specific chemicals used in fracturing fluids include those disclosed in Chemicals in Petroleum Exploration and Production II, North American Report and Forecasts to 1993, Colin A. Houston and Associates, Inc., Mamaroneck, N.Y. (1984). The aqueous transport medium can also contain the treating materials useful in the processes of the invention.

Pneumatic fracturing is a method to access sub-surface soil for remediation purposes. The fracturing of subterranean formations is accomplished by injecting a compressed gas, e.g., air, source through a wellbore at a sufficient rate in pressure to cause a fracture to form in the formation, i.e., the contaminated heterogeneous soil region. The process consists of introducing the high-pressure gas down the borehole through an injector. The pressured media creates air flow channels emanating from the injection point and forms liquid permeable regions or fractures having a radius of influence up to 40 feet from the wellbore.

Impulse fracturing is another method to access subsurface soil for remediation purposes. The fracturing of subterranean formations is accomplished with pulses of water generated by a Hydraulic Impulse Device (HID). The HID is a high-pressure hydraulic intensifier that discharges a 0.5 liter slug of fluid in a few tenths of a second. The fluid is discharged through a nozzle that can be inserted into a borehole and fires into the surrounding formation. Injection pressure increases sharply to 8500 psi (58 MPa) in 12 milliseconds and then decreases to atmospheric during the following 275 milliseconds. Velocity of the fluids at the leading edge of the impulse are on the order of 150 to 450 m/sec. Sand is introduced into the fluid phase and carried into the fracture created by the impulse. The general deformation created by a single impulse includes a cylindrical hull and fractures either parallel or normal to the axis of the hole. Additional impulses enlarge the fractures, producing liquid permeable regions.

Impulse fracturing can be performed in both overconsolidated and normally consolidated soils, whereas hydraulic fracturing is better suited for over-consolidated soils (fractures created in normally consolidated soils usually propagate vertically and intersect the ground surface). In addition, impulse fractures can be created near underground utilities and in the vicinity of structures that may be detrimentally affected by the surface deformation associated with hydraulic fractures.

Sheet piling is a method which involves driving lengths of connectable sheet piling material, e.g., steel, into the ground. The lengths of sheet piling material can be connected by any conventional means, such as with slotted connections, ball and socket type connections or interlocking joints. If the sheet piling material is to remain in the soil during treatment, the preferred connection means is the interlocking joint that incorporates a cavity that is filled with a sealant after driving to prevent leakage through the joints. The sheet pilings can be driven of depths of 100 feet (30 m) or more in unconsolidated deposits lacking boulders.

The sheet piling material is driven into the ground by use of pile hammer. The types of pile hammers include drop, single-acting steam, double-acting steam, diesel, vibratory, and hydraulic. For each type of hammer listed the driving energy is supplied by a falling mass which strikes the top of the pile. The piles are driven to their desired depth, i.e., to a point below the contaminated soil region, and the remaining above ground portion can optionally be cut off.

Sheet piling can be used in a number of ways to form treating zones. There are two ways of utilizing sheet pilings: (a) The sheets can remain in the ground, and (b) The sheets can be removed after formation of the treating zone. Regarding the case where the sheets remain, one method involves the use of a single sheet with gates containing the materials for treatment, such that the gates are treating zones. Another method for using a single sheet involves porous sheet materials impregnated with or containing treating materials which are permeable to flow during electroosmosis and/or hydraulic flow. If two sheets are used and the soil between the sheets removed and replaced with treating material, the sheets will contain some means for permitting flow through the sheets such as those discussed above. Regarding the case where the sheets are removed after formation of the treating zone, the sheets will be driven into the contaminated heterogeneous soil region to the desired depth essentially parallel to each other and the soil between the sheets removed to form a liquid permeable region of the desired size. The liquid permeable region will then be filled with the desired treating materials to form the treating zone and the sheets then removed from the soil.

Trench formation is the method that involves excavating soil to a sufficient depth at least as deep as the depth of the contaminated soil region. The trench will typically be excavated so that it extends laterally as far as is necessary to insure that all of the contaminated soil region is covered. If multiple trenches are used, they may each extend laterally to cover the entire contaminated soil region or they may overlap as long as the entire width of the contaminated soil is provided with sufficient treating zones to treat the contaminants. The excavated trench is then filled with a filling material containing the material for treating the contaminants in the contaminated soil region. In one embodiment, the trench can be filled with a slurry which contains material for treating the contaminants in the contaminated soil region provided that the slurry wall formed is permeable to the flow of liquid during the electroosmosis and/or hydraulic flow portions of the process of the invention.

Directional drilling is a method that involves utilization of a compact, omni-directional drilling system which is readily mobilized and can create bores from vertical to horizontal. A walk-over type of locator system is used to provide information on the depth, pitch and roll of the drillhead while drilling. Directional drilling can be used in most soils and can be used to create multiple channels, i.e. liquid permeable regions, of substantial length that can be directed within the contaminated heterogeneous soil region. In addition, directional drilling can be used in combination with other methods of forming liquid permeable regions which utilize a borehole, e.g., hydraulic fracturing.

Soil drilling/mixing is a method for forming continuous treating zones that involves utilizing soil drilling equipment which drills and simultaneously mixes soil with treating materials to form a treating zone comprising a relatively uniform mixture of soil treating material. Soil drilling/mixing can be accomplished by any conventional method known to those skilled in the art. The method of soil drilling/mixing which is currently preferred utilizes a soil drilling apparatus as disclosed in U.S. Pat. No. 5,135,058, which is incorporated by reference herein. Such a soil drilling apparatus is commercially available from RUST Remedial Services under the trademark MecTool™. Uniform mixing during the formation of the treating zone using the above apparatus is accomplished by the high torque applied to the mixing tool by the drill assembly. The treating material, in the form of a slurry, liquid or gas, is injected directly into the solid soil matrix at pressures up to 150 psi, and mixed in-situ with the soil. This uniform mixing coupled with the rotary and vertical movements of the injection/mixing tool, provides for the effective penetration and mixing of the treating material with the in-place soil.

The treating materials use fill in the process of the invention can be selected from the group consisting of microorganisms, nutrients, electron acceptors, catalysts, adsorbents, surfactants, electron donors, co-metabolites, chelating agents, ion exchange resins, buffers, salts and combinations thereof. Where there are more than one liquid permeable regions utilized in the process of the invention, the treating material(s) added to each liquid permeable region can be the same or different. If only one liquid permeable region is utilized in the process of the invention, generally at least one treating material in addition to surfactants will be used unless indigenous microorganisms or pre-existing treatment materials are present in the contaminated soil region. The choice of treating materials will depend upon the specific contaminated heterogeneous soil regions and the specific organic contaminants in the contaminated heterogeneous soil region.

The microorganisms useful in the process of the invention will depend upon the specific organic contaminants in the contaminated heterogeneous soil region to be bioremediated. The biodegradation can be conducted under aerobic conditions, anaerobic conditions or a combination of aerobic and anaerobic conditions. Depending on the type and number of organic contaminants present in the contaminated heterogeneous soil region, a single type of microorganism or a mixture of different microorganisms may be required. The specific microorganisms required to treat each organic contaminant present are well known to those skilled in the art.

The electron acceptors, i.e. oxidants, useful in the process of the invention will depend on the specific contaminants in the contaminated heterogeneous soil region to be treated and microorganisms used. Examples of suitable oxidants include, but are not limited to, air, hydrogen peroxide, solid oxidants, and the like, and mixtures thereof. The type of oxidant required is well known to those skilled in the art depending on the specific contaminants present.

The catalysts useful in the process of the invention will depend upon the specific contaminants present in the contaminated heterogeneous soil region to be treated. Examples of suitable catalysts include, but are not limited to, iron catalysts, alumina, and the like, and mixtures thereof. The type of catalysts required is well known to those skilled in the art depending on the specific contaminants present.

The adsorbents in the process of the invention will depend upon the specific contaminants present in the contaminated heterogeneous soil region to be treated. Examples of suitable adsorbents include, but are not limited to, activated carbon, alumina, polymeric resins, and the like, and mixtures thereof. The type of adsorbents required is well known to those skilled in the art depending on the specific contaminants present. In addition to binding organic contaminants as they pass through the treating zones, the adsorbents may also serve as a support for the microorganisms used. The benefit of using porous supports in bioreactors are well known to those skilled in the art for liquid waste treatment. It is also possible to utilize the adsorbents to trap the contaminants as they pass through the treating zones wherein the adsorbents or adsorbed contaminants can be later removed from the treating zone, or the adsorbed contaminants can be later degraded in-situ, such as by introducing additional treating materials into the treating zone, or by allowing additional time for degradation to be completed.

The surfactants useful in the process of the invention will depend upon the specific contaminated heterogeneous soil region to be treated. The surfactants of the invention can be non-ionic or anionic, preferably non-ionic as they will not interfere with electroosmosis, and it is further preferred that the surfactants be biodegradable. Examples of suitable surfactants include, but are not limited to, polyethylene glycols, tert-octylphenol ethoxylates, tert-nonylphenol ethoxylates, primary linear alcohol having 16 to 20 carbon atoms, sodium dodecylsulfate, and mixtures thereof.

The electron donors useful in the process of the invention will depend on the specific contaminants in the contaminated heterogeneous soil region to be treated and microorganisms used. Examples of suitable electron donors, include, but are not limited to, aqueous benzoate solutions, aqueous sulfate solutions and mixtures thereof. The type of electron donor required is well known to those skilled in the art depending on the specific contaminants present. Aqueous benzoate solutions can be formed utilizing sodium benzoate dissolved in water. Aqueous sulfate solutions can be formed utilizing sodium sulfate dissolved in water. Election donors are particularly useful when used in conjunction with anaerobic biodegradation for reductive dehalogenation of chlorinated ethenes.

The co-metabolites useful in the process of the invention will depend on the specific contaminants in the contaminated heterogeneous soil region to be treated and microorganisms used. Co-metabolites are compounds that microorganisms, e.g. methanotrophic bacteria, can utilize for a carbon and energy source and in the process also degrade another contaminant present in the contaminated heterogeneous soil region which cannot be effectively degraded by the microorganism alone. Co-metabolites are particularly useful in degrading chlorinated organic compounds. Examples of suitable co-metabolites include, but are not limited to, phenol, methane and mixtures thereof. The type of co-metabolite required is well known to those skilled in the art depending on the specific contaminants present and the specific microorganism used.

The chelating agents useful in the processes of the invention will depend on the specific contaminated soil region to be treated. Chelating agents are particularly useful in cases wherein ionic contaminants are present. Examples of suitable chelating agents include, but are not limited to, hydroxycarboxylic acids such as citric, tartaric and gluconic acid, aminopolycarboxylic acids such as ethylenediaminetetraacetic acid (EDTA) and nitrilotriacetic acid (NTA), polyphosphates such as sodium tripolyphosphate (STPP), polyamines such as triethylenetetramine, phosphonic acids such as ethylenediaminetetra(methylenephosphonic acid) (EDTPO), and mixtures thereof.

The ion exchange resins useful in the processes of the invention will depend on the specific contaminated soil region to be treated. The ion exchange resins can be anionic or cationic exchange resins depending on the contaminant to be treated. The currently preferred ion exchange resins are those in the free acid or free base forms. Examples of suitable ion exchange resins include, but are not limited to, Amberlyst A-21, Amberlyst 15, Amberlite IRC-50 and Amberlite IRA-93 (products of the Rohm & Haas Co.) and Dowex 50 W (product of The Dow Chemical Co.).

The buffers useful in the processes of the invention will depend on the specific contaminated soil region to be treated. Buffers, as used herein, are compounds which act to control the pH of the solution subject to electrokinetics. Buffers can also be utilized to raise the conductivity of the solution subject to electrokinetics. As such, buffers aid in the treatment of contaminants by improving the electroosmotic flow or by permitting electrokinetics to effectively operate at lower voltage gradients. Examples of buffers include, but are not limited to, lime, calcium carbonate, phosphate rock, polyphosphate, and the like, and mixtures thereof.

The salts useful in the processes of the invention will depend on the specific contaminated soil region to be treated. Salts, as used herein, are neutral salt compounds which act to raise the conductivity of the solution subject to electrokinetics. As such, salts aid in the treatment of contaminants by improving the electroosmotic flow or by permitting electrokinetics to effectively operate at lower voltage gradients. Examples of salts include, but are not limited to, calcium sulfate, sodium chloride, calcium chloride, and the like, and mixtures thereof.

Electrochemical degradation of contaminants can be achieved, for example, by preparing a least one liquid permeable region or utilizing at least one existing liquid permeable region which contains an electronically conductive material, e.g., graphite particles, such that the liquid permeable region, located between the first and second electrodes, forms a bipolar electrode in which direct or indirect electrochemical degradation occurs. An example of such an electrochemical degradation is the electrochemical reductive dechlorination of chlorinated compounds, e.g., dichloroethane and trichloroethylene, at the cathode of the bipolar electrode treating zone as the contaminants flow through the treating zones by electroosmosis or hydraulic flow.

Hydraulic flow or pressure-driven flow, resulting from application of a hydraulic gradient across the contaminated heterogeneous soil region, can be accomplished by any conventional method known to those skilled in the art. Hydraulic gradients can be produced by any conventional method known to those skilled in the art. Examples of such methods include, but are not limited to, (1) inserting perforated pipes into the ground or drilling bore holes on both ends of the contaminated heterogeneous soil region and applying pressure at the pipes or boreholes on one end of the heterogeneous soil region to cause a hydraulic gradient which results in hydraulic flow from the high pressure end of the contaminated heterogeneous soil region to the low pressure end of the contaminated heterogeneous soil region, (2) inserting perforated pipes into the ground or drilling boreholes on both ends of the contaminated heterogeneous soil region and applying a vacuum to pipes or boreholes on one end of the contaminated heterogeneous soil region to cause a hydraulic gradient which results in hydraulic flow from the high pressure end of the contaminated heterogeneous soil region to the low pressure end of the contaminated heterogeneous soil region, and (3) inserting perforated pipes into the ground or drilling boreholes on both ends of the contaminated heterogeneous soil region and applying a pressure to pipes or boreholes on one end of the contaminated heterogeneous soil region and applying a vacuum at the pipes or boreholes on the opposite end of the contaminated heterogeneous soil region to cause a hydraulic gradient which results in hydraulic flow from the high pressure end of the contaminated heterogeneous soil region to the low pressure of the end the contaminated heterogeneous soil region. The high pressure and low pressure ends of the contaminated heterogeneous soil region can be at opposite ends of the contaminated heterogeneous soil region and each end can consist of one or a plurality of pipes or boreholes or the equivalent thereof, or one of the high pressure or low pressure ends can be located within the contaminated heterogeneous soil region and the other of the high pressure or low pressure ends can consist of pipes, boreholes or the equivalent thereof surrounding the contaminated heterogeneous soil region.

The water utilized for hydraulic flow in the process of the invention can be groundwater or rainwater or external water can be supplied at the high pressure end of the contaminated heterogeneous soil region. In one embodiment, water can be removed from the contaminated heterogeneous soil region at the low pressure end of the contaminated heterogeneous soil region and externally treated to remove any contaminants by any conventional method for degrading contaminants. In a further embodiment, the treated water can, optionally, be recycled to the contaminated heterogeneous soil region at the high pressure end of the contaminated heterogeneous soil region. In the case of a closed loop system, soil flushing can also be carried out by injecting solvents or surfactants into the soil at the high pressure end of the contaminated heterogeneous soil region to enhance contaminant solubility. Subsequent to the soil treatment, the recycled water flows through the contaminated heterogeneous soil region and the water containing the contaminants, solvent and surfactant is collected at the low pressure end of the contaminated heterogeneous soil region, treated and reinjected at the high pressure end of the contaminated heterogeneous soil region.

The hydraulic flow utilized in the process of the invention can be continuous or pulsed. As used herein, the term "pulsed" means that the hydraulic flow occurs intermittently in an on-off sequence. It is currently preferred to use pulsed hydraulic flow because the percent removal of contaminants is increased compared to continuous hydraulic flow with equivalent volumes of hydraulic flow. This is particularly the case if external treatment of the hydraulic flow is utilized.

In addition, the direction of hydraulic flow though the contaminated heterogeneous soil region can be periodically reversed by reversing the hydraulic gradient. Reversal of hydraulic flow is particularly useful if treating zones are present in the high permeability regions because the back-and-forth flow scheme results in the liquid having multiple passes through the contaminated soil, each time removing additional contaminants and delivering them to the treating zones.

Electrokinetics, e.g. electroosmosis and electromigration, can be accomplished by any conventional method known to those skilled in the art, such as those disclosed in Bruell, C. J. et al., "Electroosmotic Removal of Gasoline Hydrocarbons and TCE from Clay", *J. Environ. Eng.*, Vol. 118, No. 1, pp. 68–83, January/February 1992, Segall, B. A. et al., "Electroosmotic Contaminate-Removal Processes", *J. Environ. Eng.*, Vol. 118, No. 1, pp. 84–100, January/February 1992) and Acar, Y. B. et al., "Phenol Removal from Kaolinite by Electrokinetics", *J. Geotech. Eng.*, Vol. 118, No. 11, pp. 1835–52, November 1992.

Electroosmosis, i.e. the movement of water in the soil matrix from an anode to a cathode, occurs when a constant, low DC electrical current is applied to electrodes located in the contaminated heterogeneous soil region. A first electrode will be typically located at a first end of the contaminated heterogeneous soil region and a second electrode will be typically located at the opposite end of the heterogeneous soil region or a first electrode will be located at a first end of each the low permeability soil regions and a second electrode will be located at the opposite end of each of the low permeability soil regions to cause an electroosmotic flow from one electrode to the other. As used herein, the terms "first electrode" and "second electrode" can be a single electrode or a plurality of electrodes located across the contaminated heterogeneous soil region at approximately the same horizontal or vertical level in the contaminated heterogeneous soil region depending on whether the treating zones are vertical or horizontal. Electrical connections and electrode sizes and materials will vary depending on each particular situation. Selection of electrodes will be apparent to one skilled in the art. When the contaminants in the contaminated heterogeneous soil region are organic compounds, it is currently preferred that the electrodes contain carbon or graphite particles because the carbon or graphite aids in pH buffering of the overall electrokinetic process. It is also currently preferred that the electrodes be open electrodes that permit the ingress or egress of a liquid; an open electrode may also be one which is not itself porous or perforated, but which is located within a perforated container or directly behind a liquid permeable region or zone. In addition, the electrode can also function as a treating zone, e.g. an adsorption zone, wherein the carbon or graphite particles also serve as an adsorbent.

When the treating zones are horizontal, e.g. with hydrofracturing or pneumatic fracturing, a first electrode can be located at or near ground level or above the contaminated heterogeneous soil region, and a second electrode can be located below the first electrode, preferably at the bottom or below the contaminated heterogeneous soil region. When the first electrode is located at ground level, it could simply be a metal screen lying on the ground surface. The first or second electrode, for example, can be a fracture containing electronically conducting material such as graphite particles or a mixture of graphite particles and sand formed by injecting a fracturing fluid containing sand and graphite through a second well bore at a sufficient rate and at a sufficient pressure to form the fracture. Alternatively, a first electrode can be located at or above each of the low permeability soil regions, and a second electrode can be located below the first electrode, preferably at the bottom or below each of the low permeability soil regions.

When the treating zones are vertical, e.g. with trench formation or sheet piling, a first electrode can be located at one end of the contaminated heterogeneous soil region and a second electrode can be located at the opposite end of the contaminated heterogeneous soil region or a first electrode can be located at a first end of each of the low permeability regions and a second electrode can be located at the opposite end of each of the low permeability soil regions. Suitable electrodes for use with vertical treating zones can, for example, be an electronically conductive rod, pipe or an electronically conductive granular medium, e.g. graphite or a mixture of graphite and sand, in a hole in the soil.

During electroosmosis the treating materials, e.g. microorganisms and/or oxidants, may move from the treating zones into the contaminated soil region such that the degradation of the contaminants may also occur within the contaminated heterogeneous soil region as well as in the treating zones.

In the process of the invention where water is not added or recycled to the contaminated heterogeneous region, the water used for the electroosmosis will be groundwater or rainwater, i.e. water supplied to the contaminated hetrogeneous soil region can be from an above ground source or from an in ground source outside the contaminated soil region to be treated. If groundwater alone is not sufficient, surfactants can also be introduced into the contaminated heterogeneous soil region to desorb or solubilize the contaminants from the soil. External water is not necessary when the process of the invention utilizes periodic reversal of the electrical polarity on the electrodes to reverse the liquid flow by electroosmosis, recycle of electroosmotic flow, recycle of hydraulic flow or utilization of in ground water located outside the contaminated soil region to be treated. However, it is currently preferred to utilize periodic reversal of the electrical polarity on the electrodes because it has been found that periodic reversal of flow minimizes the soil drying and pH effects associated with extended electroosmotic operation. This simple back-and-forth flow scheme also results in the liquid having multiple passes through the contaminated soil, each time removing additional contaminants from the soil and delivering them to the treating zones. When this reversal of flow technique is used, the presence of an adsorbent in the treating zones is particularly advantageous. The use of an adsorbent effectively decouples mass transport from reaction or bioremediation. As the liquid passes through the treating zone, the contaminants are adsorbed and held on the adsorbent surface where the microorganisms can degrade them at their own pace either during electroosmosis or after electroosmosis if required for more effective treatment. It has also been found that recycle of electroosmotic flow also minimizes the soil drying and pH effects associated with extended electroosmotic operation.

In the process of the invention wherein external liquid comprising water is added or recycled to the contaminated heterogeneous soil region, the liquid can be added through an open electrode, through pipes or boreholes at the high pressure end of the contaminated heterogeneous soil region or at another location within the contaminated heterogeneous soil region. An open electrode is one which permits the flow of a liquid, e.g. water. An open electrode may be one which itself is perforated or porous, such as electronically conductive rods, pipes or granular media to permit the ingress or egress of a liquid; an open electrode may also be one which is not itself perforated, but which is located within a perforated container. The external liquid may also contain surfactants to desorb the contaminants from the soil. The reversal of flow technique or the recycle of electroosmotic flow technique described herein can also be utilized in the process of the invention where a liquid is supplied to the contaminated heterogeneous soil region.

The contaminated heterogeneous soil region will be periodically sampled, such as by taking a core sample, and the soil analyzed to determine if the level of contaminants has been reduced to an acceptable level. When the sample analysis indicates that the contaminant level has fallen to or below the acceptable level, the process of the invention can be stopped.

EXAMPLES

Example 1

The following example demonstrates that electroosmosis is able to effectively and uniformly remove contaminants from a very heterogeneous soil matrix.

The electroosmotic cell used in the study is shown in FIG. 1. The ell is a cylindrical tube made of clear plastic, 4" inside diameter and 8.5" long. Packed in the 2.5 inch midsection of the cell (50) was a piece of kaolinite clay surrounded by fine sand to simulate a heterogeneous soil matrix. Hydraulic conductivity of the clay used is on the order of $10^{-8}$ cm/sec, and that of the sand is $10^{-2}$ cm/sec. The clay piece was uniformly contaminated with an aqueous solution containing p-nitrophenol (PNP) as the model organic contaminant. 300 g dry kaolinite clay was mixed with 179.5 g of an aqueous solution containing 1062 mg PNP/L, which resulted in a clay paste of 37.5 wt % moisture with a loading of 0.398 mg PNP/g wet clay. 222.6 g of the clay-PNP mixture was packed in the cell, resulting in a total PNP loading on the clay piece of 88.6 mg PNP. This PNP-contaminated clay section was surrounded by about 500 g (dry weight) of fine sand. The sand was also uniformly contaminated with the PNP solution to a total PNP loading of 100.9 mg in the sand. The sand/clay section was bracketed at each end with a half-inch layer of sand and carbon particles, (40) and (70), having about 2.4% carbon by weight. The carbon used was a commercially available activated carbon found effective for adsorbing PNP. The sand-carbon layers thus represented liquid-permeable adsorption zones or treating zones. Uncontaminated kaolinite clay, (30), (about 38 wt % moisture and 1.5" thick) was packed next to each sand-carbon layer to simulate clean soil. Half-inch thick layers of granular activated carbon particles were packed next to the clean clay sections to function as electrodes. Connections to the electrodes were made with graphite rods (80) inserted into the packed carbon layers. Half-inch thick layers of uncontaminated kaolinite clay, (10), (about 38 wt % moisture) were packed outside of each electrode. During the electroosmosis experiment, water was fed into the cell and taken out through the electrode layers. Well water was used throughout the experiment to simulate groundwater.

The experiment was run at room temperature and at a constant voltage gradient, about 1 volt/cm, across the soil mass between the electrodes. The experiment was first run with electrode (60) as the anode and electrode (20) as the cathode. The direction of water flow during electroosmosis was thus from electrode (60) to electrode (20). After one day, liquid volume equal to about one pore volume of section (50) (sand+clay) was collected from the cathode (20). The electrical polarity was then reversed, causing water to flow in the direction from electrode (20) to electrode (60). After about two days, 1.4 pore volumes of liquid was collected from electrode (60). The electrical current to the cell was turned off to stop electroosmosis. Water was then pumped through section (40) to flush out PNP still left in the sand area surrounding the clay. In 1.5 hours, two pore volumes of liquid (based on the sand of section 50) were pumped through the sand section, recovering 2.34 mg PNP, which is equivalent to only about 2 wt % of the initial amount of PNP introduced into the sand of section 50. The cell was then taken apart for analysis. Each clay sample was analyzed by extracting the PNP from the clay sample with 0.1 N NaOH solution and measuring the level of PNP in solution by spectrophotometric absorption at 400 nm using a Beckman DU-7 spectrophotometer. One extraction was sufficient to remove all the PNP from the clay. The sand samples were analyzed in a manner similar to that used for the clay. For the samples of carbon, which binds PNP much more tightly, the extraction solution used contained 0.1 N NaOH and 2 wt % methylene chloride, and repeated extractions were conducted to maximize PNP recovery. It was found that PNP removal from the clay piece in section 50 was quite uniform, averaging about 97 wt % removal. There was no PNP left in the sand of section 50. Approximately 93 wt % of the initial PNP loaded in section 50 was recovered from the carbon in sections 40 and 70. No PNP was detected in clean clay sections 30. An overall mass balance for PNP of 95% was obtained.

Example 2

The following example demonstrates that electroosmosis can be effective for transporting contaminants out of isolated low-permeability zones, and that the combination of electroosmosis and hydraulic flow can result in very rapid cleanup of contaminated heterogeneous soil regions.

Figure 2:
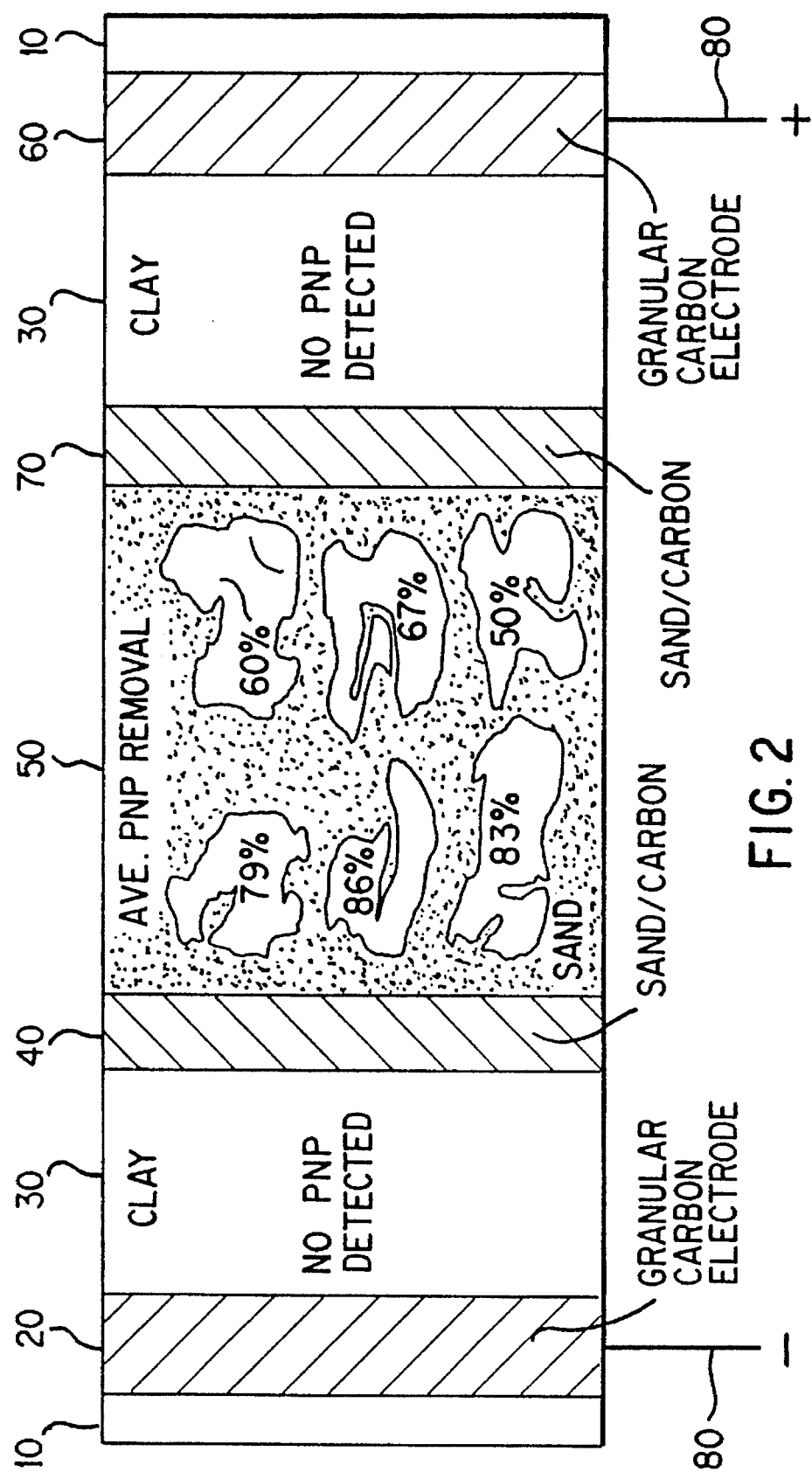
FIG. 2 is a view of the electroosmotic cell set-up used in Example 2.

The experimental set up is similar to that used in Example 1 except that (a) the big clay piece in section 50 was divided into six smaller pieces separated from one another and surrounded by fine sand and (b) the sand in section 50 was not contaminated with PNP. The sand in section 50 was not contaminated with PNP so that movement of PNP out of the clay pieces could be easily detected. The initial PNP loading of the clay pieces in section 50 was 40.1 mg, i.e. 402 μg PNP/g wet clay. In addition, the experiment was deliberately carried out for a very short period to study the transient characteristics of the system. The experiment was run for approximately 10 hours with a voltage gradient of 1 volt/cm, during which time a liquid volume equivalent to 0.37 pore volumes of the sand/carbon section (50), i.e. 72.8 g water, was collected from the cathode (20). Electroosmosis was then stopped, and water was flushed for about 2 hours through section 50 such that the direction of the hydraulic flow was essentially perpendicular to the direction of the electroosmotic flow. The total water flushed was 463.8 g, which is equivalent to 3.2 pore volumes of the sand portion of section 50. This flushing recovered 22.7 mg PNP (about 57 wt %) of the initial PNP loading on the clay pieces. Subsequent analysis for PNP, conducted as in Example 1, shows that no PNP was left in the sand portion after the water flushing, and that for the clay pieces an average PNP removal of 70 wt % was obtained, i.e. 12 mg PNP remained in the clay pieces in section 50. It is interesting, as shown in FIG. 2, that the clay pieces nearer the anode (60) had a lower average PNP removal (about 60 wt %) than the ones nearer the cathode (20) (about 80 wt %). While not wishing to be bound by theory, this could be a consequence of a non-uniform voltage gradient along the cell, which has been documented in Segall, B. A. et al., "Electroosmotic Contaminant-Removal Processes", *J. Environ. Eng.*, Vol. 118, No. 1, pp. 84–100, January/February 1992, and Acar, Y. B. et al., "Phenol Removal from Kaolinite by Electrokinetics", *J. Geotechnical Eng.*, Vol. 118, No. 11, pp. 1837–52 (Nov. 1992), causing uneven water flow in the axial direction even though the radial flow distribution can be quite uniform. Again, no PNP was detected in the clean clay sections (30), and the balance of the PNP removed from section 50 was found in the sand/carbon sections 40 and 70. Of the PNP recovered in sections 40 and 70, 4.8 mg was recovered in section 40, i.e. 12 wt % of the initial PNP loading, and 0.3 mg was recovered in section 70, i.e. 0.75 wt % of the initial PNP loading. An overall mass balance for PNP of 103% was obtained.

Example 3

This example is a repeat of Example 2 and was intended to test how effectively electroosmosis would move PNP From small clay pieces contained within a sand matrix simulating a heterogeneous environment. There were two differences introduced in this example: (1) extended operation to demonstrate significant removal of PNP From the clay pieces and (2) the length of the contaminated soil section was increased from 2.5 inches to 4 inches to increase the axial distance between the two rows of clay pieces, thus minimizing the cross-contamination between the rows during electroosmosis.

Six pieces of PNP/Clay (about 14 g each) contained 410 μg PNP/g wet clay for a total initial loading of 36.1 mg PNP. The pieces were spaced apart from each other in the cell to allow PNP to leave one piece but not flow into another. The pieces were oriented at a 120° angle from each other at the top, front and back of the module near the anode and bottom, front and back near the cathode. The clay pieces were surrounded with a continuous sand matrix. Pore volume of the sand/clay section is about 301 cm3 (254 cm3 for the sand, and 47 cm3 for the clay pieces).

The electroosmotic cell was operated at a constant voltage (1 volt/cm, 17.5 V total) for four days in one direction; the current started at 7 mA declining gradually to 1 mA at the end of the run. A total liquid effluent of 163 g H2O was collected from the cathode, equivalent to 0.54 pore volume of the sand/clay section. Following the electroosmosis, a high pressure liquid chromatography pump was connected to the lower port in the sand area near the anode. The output was connected to the upper port near the cathode. Acidified (pH=3.0) mili-Q water was flushed through at 4 mL/min for 1 hour and then reduced to 2 mL/hr for about 3 hours that day and 1 additional hour the following morning for a total of 716 mL (2.8 pore volumes of the sand). The solutions collected were analyzed for PNP. The cell was then disassembled with each section separated and analyzed for PNP using a spectrophotometer. It was noticed that during the initial flushing at 4 ml/min some liquid was overflowing from the anode section. Apparently the effluent may have channeled around the thin clean clay area between the contaminated soil region and the anode, then exited through the activated carbon anode. Some PNP in the sand zone was thus not accounted for since the activated carbon anode was discarded after the run.

Overall PNP removal from the clay pieces was over 99%, ranging from 98.6 to 99.9% removal from the individual clay pieces. The adsorption zone near the cathode contained 12.4 mg PNP or 34.3% of the initial total loading. The adsorption zone near the anode contained 2.6 mg PNP or 7.2% of the initial total loading. Since the electroosmotic flow never flowed in that direction, the presence of PNP in this zone results either from back diffusion of PNP in the sand zone, or more likely from the channeling observed during the flushing. Flushing resulted in the recovery of about 9.8 mg PNP (27% of the initial total loading) from the sand zone. An overall mass balance for PNP of only 70% was obtained, probably a consequence of the PNP loss during flushing. Nevertheless, the example demonstrates clearly that electroosmosis can effectively clean up contamination in low permeability soils in a heterogeneous matrix.

That which is claimed is:

1. A process for the in-situ remediation of a contaminated heterogeneous soil region comprising:

(a) introducing material for treating contaminants in said contaminated heterogeneous soil region selected from the group consisting of microorganisms, nutrients, electron acceptors, catalysts, adsorbents, surfactants, electron donors, co-metabolites, chelating agents, ion exchange resins, buffers, salts and combinations thereof, into at least one liquid permeable region within said contaminated heterogeneous soil region to form at least one treating zone within said contaminated heterogeneous soil region, (b) transmitting direct electric current through at least one low permeability soil region within said contaminated heterogeneous soil region between a first electrode and a second electrode having opposite charge, wherein (i) said first electrode is located at a first end of said contaminated heterogeneous soil region and said second electrode is located at the opposite end of said contaminated heterogeneous soil region or (ii) said first electrode is located at a first end of each of said low permeability soil regions and said second electrode is located at the opposite end of each of said low permeability soil regions, (1) to cause an electroosmotic flow from said second electrode to said first electrode, (2) to cause an electromigratory movement of ionic contaminants in a direction toward the electrode of opposite charge, or (3) to cause an electroosmotic flow from said second electrode to said first electrode and an electromigratory movement of ionic contaminants in a direction toward the electrode of opposite charge, and (c) applying a hydraulic gradient across said contaminated heterogeneous soil region to cause a hydraulic flow from the high pressure end of said contaminated heterogeneous soil region to the low pressure end of said contaminated heterogeneous soil region.

2. The process of claim 1 further comprising:

(d) (1) periodically reversing the polarity of said first and second electrodes to reverse the direction of movement of said contaminants through said treating zones, (2) recycling water from said electroosmotic flow from said first electrode to said second electrode, or (3) periodically reversing the polarity of said first and second electrodes to reverse the direction of movement of said contaminants through said treating zones and recycling water from said electroosmotic flow in the direction opposite said electroosmotic flow.

3. The process of claim 2 further comprising:

(e) periodically reversing said hydraulic gradient across said contaminated heterogeneous solid region to reverse the direction of hydraulic flow through said contaminated heterogeneous soil region.

4. The process of claim 2 wherein the polarity of said first and second electrodes is periodically reversed to reverse the direction of movement of said contaminants through said treating zones.

5. The process of claim 2 wherein water from said electroosmotic flow is recycled from said first electrode to said second electrode.

6. The process of claim 2 wherein the polarity of said first and second electrodes is periodically reversed to reverse the direction of movement of said contaminants through said treating zones and water from said electroosmotic flow is recycled in the direction opposite said electroosmotic flow.

7. The process of claim 1 further comprising:

(d) periodically reversing said hydraulic gradient across said contaminated heterogeneous soil region to reverse the direction of hydraulic flow through said contaminated heterogeneous soil region.

8. The process of claim 1 wherein said direct electric current of (b) causes an electroosmotic flow from said second electrode to said first electrode.

9. The process of claim 1 wherein said direct electric current of (b) causes an electromigratory movement of ionic contaminants in a reaction toward the electrode of opposite charge.

10. The process of claim 1 wherein said direct electric current of (b) causes an electroosmotic flow from said second electrode to said first electrode and an electromigratory movement of ionic contaminants in a direction toward the electrode of opposite charge.

11. The process of claim 1 wherein said hydraulic gradient is applied continuously.

12. The process of claim 1 wherein said hydraulic gradient is applied periodically.

13. The process of claim 1 wherein at least one of said treating zones is within a low permeability soil region.

14. The process of claim 1 wherein said liquid permeable regions are formed by a method selected from the group consisting of hydrofracturing, pneumatic fracturing, impulse fracturing, sheet piling, trench formation, directional drilling, soil drilling/mixing and combinations thereof.

15. The process of claim 1 wherein at least one of said treating zones contain an electronically conductive material.

16. The process of claim 1 wherein said hydraulic flow is removed from the low pressure end of said contaminated heterogeneous soil region and treated to remove contaminants contained therein.

17. The process of claim 16 wherein the treated hydraulic flow is recycled to said contaminated heterogeneous soil region at the high pressure end of said contaminated heterogeneous soil region.

18. The process of claim 1 wherein said hydraulic flow and said electroosmotic flow are essentially co-current.

19. The process of claim 1 wherein said hydraulic flow and said electroosmotic flow are in opposing directions.

20. The process of claim 1 wherein steps (b) and (c) are conducted sequentially.

21. The process of claim 1 wherein steps (b) and (c) are conducted simultaneously.

22. The process of claim 1 wherein at least one of said treating zones is continuous.

23. A process for the in-situ remediation of a contaminated heterogeneous soil region comprising:

(a) forming at least one liquid permeable region within said contaminated heterogeneous soil region, (b) introducing material for treating contaminants in said contaminated heterogeneous soil region selected from the group consisting of microorganisms, nutrients, electron acceptors, catalysts, adsorbents, surfactants, electron donors, co-metabolites, chelating agents, ion exchange resins, buffers, salts and combinations thereof, into said liquid permeable regions within said contaminated heterogeneous soil region to form at least one treating zone within said contaminated heterogeneous soil region, (c) transmitting direct electric current through at least one low permeability soil region within said contaminated heterogeneous soil region between a first electrode and a second electrode having opposite charge, wherein (i) said first electrode is located at a first end of said contaminated heterogeneous soil region and said second electrode is located at the opposite end of said contaminated heterogeneous soil region or (ii) said first electrode is located at a first end of each of said low permeability soil regions and said second electrode is located at the opposite end of each of said low permeability soil regions, (1) to cause an electroosmotic flow from said second electrode to said first electrode, (2) to cause an electromigratory movement of ionic contaminants in a direction toward the electrode of opposite charge, or (3) to cause an electroosmotic flow from said second electrode to said first electrode and an electromigratory movement of ionic contaminants in a direction toward the electrode of opposite charge, and (d) applying a hydraulic gradient across said contaminated heterogeneous soil region to cause a hydraulic flow from the high pressure end of said contaminated heterogeneous soil region to the low pressure end of said contaminated heterogeneous soil region.

24. The process of claim 23 wherein said liquid permeable regions are formed by a method selected from the group consisting of hydrofracturing, pneumatic fracturing, impulse fracturing, sheet piling, trench formation, directional drilling, soil drilling/mixing and combinations thereof.

25. The process of claim 23 wherein said direct electric current of (c) causes an electroosmotic flow from said second electrode to said first electrode.

26. The process of claim 23 wherein said direct electric current of (c) causes an electromigratory movement of ionic contaminants in a direction toward the electrode of opposite charge.

27. The process of claim 23 wherein said direct electric current of (c) causes an electroosmotic flow from said second electrode to said first electrode and an electromigratory movement of ionic contaminants in a direction toward the electrode of opposite charge.

28. The process of claim 23 further comprising:
(e) (1) periodically reversing the polarity of said first and second electrodes to reverse the direction of movement of said contaminants through said treating zones, (2) recycling water from said electroosmotic flow from said first electrode to said second electrode, or (3) periodically reversing the polarity of said first and second electrodes to reverse the direction of movement of said contaminants through said treating zones and recycling water from said electroosmotic flow in the direction opposite said electroosmotic flow.

29. The process of claim 28 further comprising:
(f) periodically reversing said hydraulic gradient across said contaminated heterogeneous soil region to reverse the direction of hydraulic flow through said contaminated heterogeneous soil region.

30. The process of claim 28 wherein the polarity of said first and second electrodes is periodically reversed to reverse the direction of movement of said contaminants through said treating zones.

31. The process of claim 28 wherein water from said electroosmotic flow is recycled from said first electrode to said second electrode.

32. The process of claim 12 wherein the treated hydraulic flow is recycled to said contaminated heterogeneous soil region at the high pressure end of said contaminated heterogenous soil region.

33. The process of claim 28 wherein the polarity of said first and second electrodes is periodically reversed to reverse the direction of movement of said contaminants through said treating zones and water from said electroosmotic flow is recycled in the direction opposite said electroosmotic flow.

34. The process of claim 23 further comprising:
(e) periodically reversing said hydraulic gradient across said contaminated heterogeneous soil region to reverse the direction of hydraulic flow through said contaminated heterogeneous soil region.

35. The process of claim 23 wherein said hydraulic flow is removed from the low pressure end of said contaminated heterogeneous soil region and treated to remove contaminants contained therein.

36. The process of claim 23 wherein at least one of said treating zones are continuous.

37. A process for the in-situ remediation of a contaminated heterogeneous soil region comprising:
(a) introducing material for treating contaminants in said contaminated heterogeneous soil regions selected from the group consisting of microorganisms, nutrients, electron acceptors, catalysts, adsorbents, surfactants, electron donors, co-metabolites, chelating agents, ion exchange resins, buffers, salts and combinations thereof, into at least one liquid permeable region within said contaminated heterogeneous soil region to form at least one treating zone within said contaminated heterogeneous soil region,
(b) transmitting direct electric current through at least one low permeability soil region within said contaminated heterogeneous soil region between a first electrode and a second electrode having opposite charge, wherein (i) said first electrode is located at a first end of said contaminated heterogeneous soil region and said second electrode is located at the opposite end of said contaminated heterogeneous soil region or (ii) said first electrode is located at a first end of each of said low permeability soil regions and said second electrode is located at the opposite end of each of said low permeability soil regions, (1) to cause an electroosmotic flow from said second electrode to said first electrode, (2) to cause an electromigratory movement of ionic contaminants in a direction toward the electrode of opposite charge, or (3) to cause an electroosmotic flow from said second electrode to said first electrode and an electromigratory movement of ionic contaminants in a direction toward the electrode of opposite charge,
(c) (1) periodically reversing the polarity of said first and second electrodes to reverse the direction of movement of said contaminants through said treating zones, (2) recycling water from said electroosmotic flow from said first electrode to said second electrode, or (3) periodically reversing the polarity of said first and second electrodes to reverse the direction of movement of said contaminants through said treating zones and recycling water from said electroosmotic flow in the direction opposite said electroosmotic flow, and
(d) applying a hydraulic gradient across said contaminated heterogeneous soil region to cause a hydraulic flow from the high pressure end of said contaminated heterogeneous soil region to the low pressure end of said contaminated heterogeneous soil region.

38. The process of claim 37 further comprising:
(e) removing said hydraulic flow from the low pressure end of said contaminated heterogeneous soil region and treating said hydraulic flow to remove contaminants contained therein.

39. The process of claim 38 wherein the treated hydraulic flow is recycled to said contaminated heterogeneous soil region at the high pressure end of said contaminated heterogeneous soil region.

40. The process of claim 37 wherein said direct electric current of (b) causes an electroosmotic flow from said second electrode to said first electrode.

41. The process of claim 37 wherein said direct electric current of (b) causes an electromigratory movement of ionic contaminants in a direction toward the electrode of opposite charge.

42. The process of claim 37 wherein said direct electric current of (b) causes an electroosmotic flow from said second electrode to said first electrode and an electromigratory movement of ionic contaminants in a direction toward the electrode of opposite charge.

43. The process of claim 37 wherein the polarity of said first and second electrodes is periodically reversed to reverse the direction of movement of said contaminants through said treating zones.

44. The process of claim 37 wherein water from said electroosmotic flow is recycled from said first electrode to said second electrode.

45. The process of claim 37 wherein the polarity of said first and second electrodes is periodically reversed to reverse the direction of movement of said contaminants through said treating zones and water from said electroosmotic flow is recycled in the direction opposite said electroosmotic flow.

46. The process of claim 37 further comprising:
(e) periodically reversing said hydraulic gradient across said contaminated heterogeneous soil region to reverse the direction of hydraulic flow through said contaminated heterogeneous soil region.

* * * * *

UNITED STATES PATENT AND TRADEMARK OFFICE
CERTIFICATE OF CORRECTION

PATENT NO. : 5,476,992
DATED : November 17, 1993
INVENTOR(S) : Ho et al.

Page 1 of 1

It is certified that error appears in the above-identified patent and that said Letters Patent is hereby corrected as shown below:

In column 8, line 2, please replace the term "ace" with the term "are"
In column 8, line 59, please replace the U.S. Patent No. "4,067,339" with the No. "4,067,389"
In column 12, line 1, please replace the phrase "use fill" with the "useful"
In column 16, line 55-56, please replace the term "hetrogeneous" with the term "heterogenous"
In column 17, line 54, please the term "ell" with the term "cell"
In column 19, line 7, please delete the "." before the word "could"
In column 19, line 53, please replace the term "From" with the word "from"
In column 19, line 56, please replace the term "From" with the word "from"
In column 20, line 26, please replace the term "afar" with the term "after"
In column 21, line 52, please replace the term "reaction" with the term "direction"
In column 6, line 19, please replace the term "though" with the term "through"
In column 14, line 12, please replace the term "a" with the term "at"
In column 15, line 30, please replace the term "though" with the term "through"

Signed and Sealed this

Fifth Day of June, 2001

Attest:

Attesting Officer

NICHOLAS P. GODICI

*Acting Director of the United States Patent and Trademark Office*